United States Patent Office 2,723,293
Patented Nov. 8, 1955

2,723,293

2-LOWER ALKOXY-2-ETHYLBUTYRYLUREA AND METHOD OF PREPARING SAME

Otis E. Fancher and Dale A. Stauffer, Elkhart, Ind., assignors to Miles Laboratories, Inc., Elkhart, Ind., a corporation of Indiana No Drawing. Application February 24, 1954, Serial No. 412,379

4 Claims. (Cl. 260—553)

This invention relates to derivatives of 2-ethylbutyrylurea which have been found to possess excellent physiological activity as hypnotics and sedatives. More particularly, this invention relates to 2-alkoxy-2-ethylbutyrylureas which can be produced by reacting a 2-halo-2-ethylbutyrylurea with an alkali metal alcoholate as indicated in the following reaction:

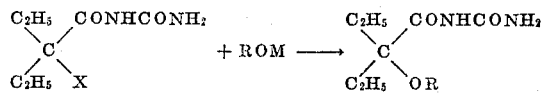

wherein X represents halogen, M is an alkali metal, and R is a lower alkyl.

The new compounds contemplated by this invention can be obtained in good yields by combining the reactants on an essentially equimolar basis without recourse to catalytic materials.

The following specific examples are illustrative of the class of compounds encompassed by our invention and of the method for their production.

EXAMPLE I

*2-methoxy-2-ethylbutyrylurea*

2-bromo-2-ethylbutyrylurea (47.4 g., 0.2 mole) and 150 ml. of methanol were stirred while sodium methoxide (10.8 g., 0.2 mole) was added over a period of thirty minutes. After the spontaneous exothermic reaction was over, the mixture was refluxed for three hours. The methanol was distilled off under reduced pressure and 100 ml. of water was added. After acidification with hydrochloric acid the solid material was collected and crystallized from ligroin, B. P. 85–100°, as colorless crystals which melted at 133–134°. Percent found: 15.01; calculated for $C_8H_{16}N_2O_3$: 14.88%.

EXAMPLE II

*2-isopropoxy-2-ethylbutyrylurea*

A quantity of 5.75 g. (0.25 mole) of sodium was dissolved in 250 ml. of dry isopropyl alcohol. 59 g. (0.25 mole) of 2-bromo-2-ethylbutyrylurea was added and the mixture was refluxed for 2½ hours. The hot solution was filtered to remove sodium bromide. The solid which separated was filtered off, and the filtrate was diluted with water. A heavy oil separated and slowly solidified.

The first solid after recrystallization from alcohol proved to be 2-ethylcrotonylurea, M. P. 190–193°. The second solid after crystallization from ligroin, B. P. 85–100°, melted at 110–115°. Percent N found: 13.11; calculated for 2-isopropoxy-2-ethylbutyrylurea, $C_{10}H_{20}N_2O_3$: 12.95%. After one more crystallization from ligroin this material melted at 114–116°; percent N found: 12.86.

Having thus described our invention, we claim:

1. A 2-alkoxy-2-ethylbutyrylurea having the formula $$\begin{array}{c} C_2H_5 \\ \diagdown \\ C_2H_5 \diagup C \diagdown OR \end{array} \diagup CONHCONH_2$$

wherein R is a lower alkyl.

2. 2-methoxy-2-ethylbutyrylurea.

3. 2-isopropoxy-2-ethylbutyrylurea.

4. A method of producing a 2-alkoxy-2-ethylbutyrylurea which comprises reacting a 2-halo-2-ethylbutyrylurea with an alkali metal alcoholate prepared from a lower alkanol.

No references cited.